United States Patent
Akemakou

[19]
[11] Patent Number: 6,093,992
[45] Date of Patent: Jul. 25, 2000

[54] ELECTRICAL MACHINE WITH DUAL EXCITATION, ESPECIALLY A MOTOR VEHICLE ALTERNATOR

[75] Inventor: Dokou Antoine Akemakou, Vitry sur Seine, France

[73] Assignee: Valeo Equipments Electriques Moteur, Creteil, France

[21] Appl. No.: 09/166,787

[22] Filed: Oct. 5, 1998

[30] Foreign Application Priority Data

Oct. 7, 1997 [FR] France ..................... 9712472

[51] Int. Cl.⁷ .......................... H02K 21/12; H02K 21/44
[52] U.S. Cl. .................... 310/156; 310/263; 310/261; 310/266; 310/179
[58] Field of Search .................... 310/179, 156, 310/266, 261, 181, 263; 322/46

[56] References Cited

U.S. PATENT DOCUMENTS

| | | | |
|---|---|---|---|
| 4,703,212 | 10/1987 | Aboukrat et al. ............ | 310/218 |
| 4,978,878 | 12/1990 | Dijken ....................... | 310/268 |
| 5,130,590 | 7/1992 | Sugiura ...................... | 310/114 |
| 5,345,133 | 9/1994 | Satake ....................... | 310/266 |
| 5,825,116 | 10/1998 | Ishikawa ..................... | 310/263 |

FOREIGN PATENT DOCUMENTS

| | | | |
|---|---|---|---|
| 0707 374 | 4/1996 | European Pat. Off. ........ | H02K 21/38 |
| 0 723 330 | 7/1996 | European Pat. Off. ........ | H02K 21/04 |
| 1527594 | 11/1968 | France . | |
| 41 39 843 | 6/1993 | Germany .................... | H02K 21/14 |
| 95/00996 | 1/1995 | WIPO ........................ | H02K 1/22 |

OTHER PUBLICATIONS

French Search report dated Jul. 3, 1998.

*Primary Examiner*—Nicholas Ponomarenko
*Assistant Examiner*—Burton S. Mullins
*Attorney, Agent, or Firm*—Morgan & Finnegan, LLP

[57] ABSTRACT

A rotary electrical machine has at least one stator and a rotor. The stator includes at least one armature winding received in at least one pair of slots. The rotor includes flux switching arrangement, which is adapted for selectively establishing closed magnetic circuits which pass around the turns of the armature winding. The arrangement for switching the flux comprises at least one permanent magnet adapted to establish a magnetic flux which is looped on itself in one circumferential direction of the rotor, together with at least one excitation winding for establishing an adjustable magnetic flux locally in a circumferential direction opposite to the direction of the flux produced by the magnets.

17 Claims, 2 Drawing Sheets

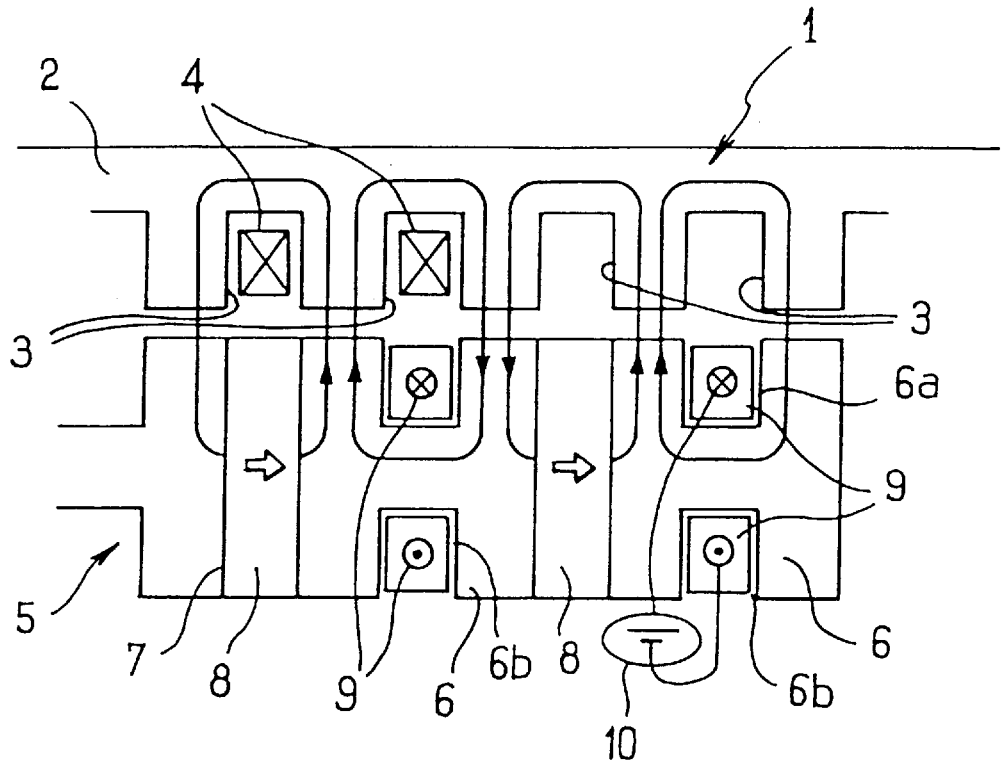
FIG_1
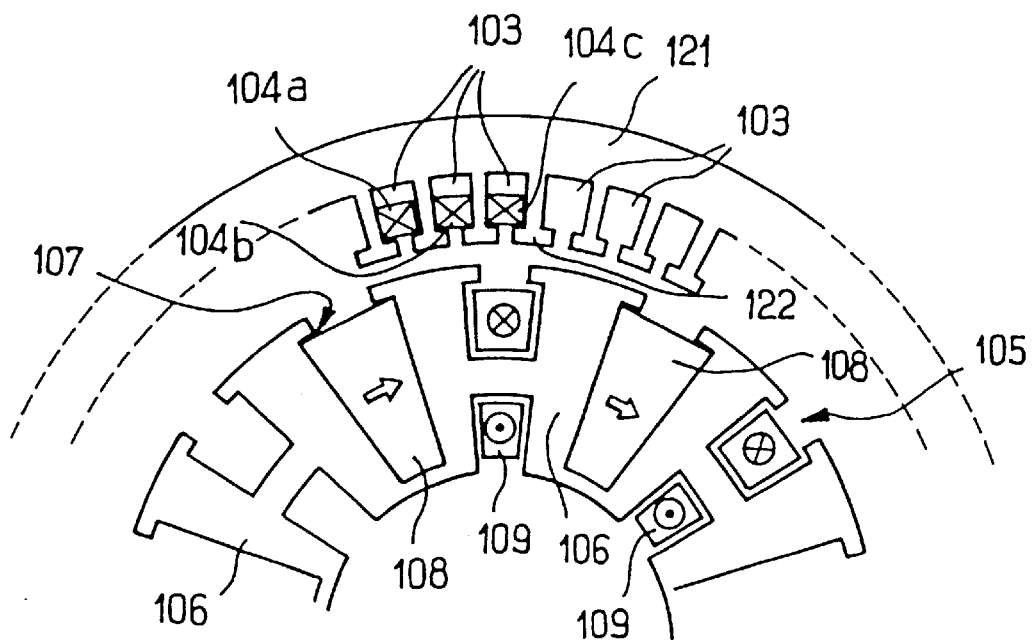
FIG_2

20

ELECTRICAL MACHINE WITH DUAL EXCITATION, ESPECIALLY A MOTOR VEHICLE ALTERNATOR

FIELD OF THE INVENTION

The present invention relates in general terms to rotary electrical machines such as alternators for motor vehicles.

BACKGROUND OF THE INVENTION

The single phase or multi-phase generator that constitutes a conventional alternator for a motor vehicle generally comprises a stator within which a rotor, which carries an excitation winding, rotates. The excitation winding is energized through brushes in contact with two slip rings arranged on a projecting portion of the shaft of the rotor.

Various rotary machines are known, in particular from European patent specification No. EP 0 707 374, in which the windings of the stator are excited at the same time by permanent magnets and by excitation windings, and in which the current delivered by the armature to the excitation windings is controlled by switching, with inversion of the excitation current serving to reduce the flux of the magnets at high speeds.

However, since the excitation current is, by nature in this type of machine, a two-way alternating current, such switching makes it necessary to have recourse to an H-shaped switching bridge, which is an expensive item.

DISCUSSION OF THE INVENTION

The present invention aims to overcome these drawbacks and to propose a rotary machine, in particular an alternator, in which regulation of the current delivered can be achieved by acting on the excitation, and in which, despite the use of permanent magnets to effect this excitation, the latter can be varied between a zero or essentially zero value and a maximum value of excitation.

Another object of the invention is to provide a machine in which the excitation varies within such limits as a result of the application of an excitation current which itself also varies between zero value and a maximum value.

A further object of the invention is to propose a structure for a rotary machine with a double air gap and a single rotor, which is compact in the axial direction and which has an increased power-to-weight ratio.

According to the invention in a first aspect, an electrical machine having at least one stator and a rotor, the stator having at least one armature winding mounted in at least one pair of slots, the rotor including means which are adapted for selectively establishing closed magnetic circuits passing around the turns of the armature winding or windings, wherein in that the means include at least one permanent magnet adapted to set up a magnetic flux which is looped on itself in a circumferential direction of the rotor, and at least one excitation winding for establishing an adjustable local magnetic flux in a circumferential direction inverse to that of the flux produced by the magnet or magnets.

Such a regulating structure permits the use of a conventional regulator as an interrupter for regulating the excitation, which divides by four the cost arising from the interrupters by comparison with machines working with two-way current.

Preferably, the rotor includes along its periphery a plurality of permanent magnets arranged alternately with excitation windings.

Preferably, in particular, the rotor has a plurality of permanent magnets arranged alternately with H-shaped structures which define slots in which the excitation windings are received. These H-shaped elements enable the winding heads to be reduced in length, which reduces the resistances and therefore the excitation energy losses. Output is therefore improved.

In preferred embodiments, the machine has both an inner stator and an outer stator. One of the advantages of this arrangement as compared with a conventional rotary machine of the kind having double rotors arises from the fact that the rotating inertia is reduced.

Such an arrangement is preferably used as a combined alternator and starter motor with a high power-to-weight ratio, given that it has a short axial length and has to deliver high output power on the two stators.

According to the invention in a second aspect, there is provided a rotor for a hybrid electrical machine with double excitation, as defined above.

Further features and advantages of the invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 1 is a diagrammatic view, in developed form, i.e. projected in one plane, of a rotor and stator assembly of a rotary machine in a simplified embodiment of the invention.

FIG. 2 is a view in transverse cross section of part of a rotor and stator assembly of a three-phase machine in accordance with the invention.

DESCRIPTION OF PREFERRED EMBODIMENTS OF THE INVENTION

Figure 3:
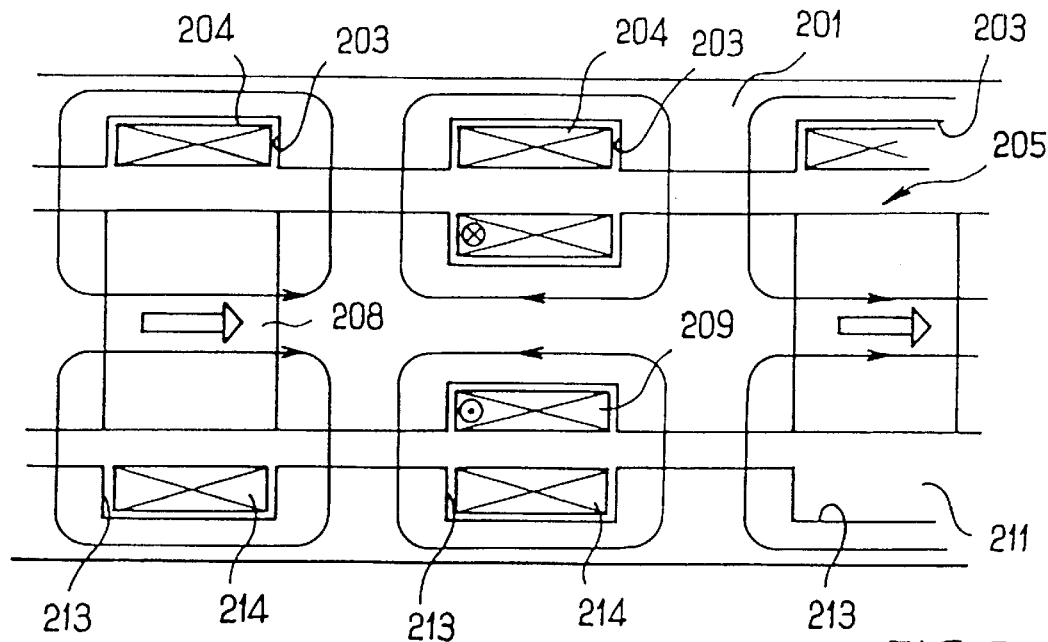
FIG. 3 is a diagrammatic view in developed form of a rotor and stator assembly of a rotary machine in a further embodiment of the invention.

Reference is first made to FIG. 1, which shows a stator 1 and a rotor 5 for a single-phase electrical rotary machine in a first embodiment of the invention. The stator 1 comprises an annular stator body 2 which is in two parts defining an endless annular structure. The inner periphery of this structure is formed with a set of stator slots 3 which receive the turns of an armature winding 4.

These slots 3 are arranged in an even number, and are spaced apart at regular intervals on the periphery of the stator 1.

The rotor 5 is defined by a succession of H-shaped elements 6, which are arranged alternately with seatings 5 in which permanent magnets 8 are received. The H-shaped elements 6 are defined by outer slots 6a and inner slots 6b. The rotor includes a rotor winding or excitation winding, the turns 9 of which are received in the outer and inner rotor slots 6a and 6b. The rotor winding 9 is connected to suitable means represented in FIG. 1 at 10, for supplying the rotor winding with an adjustable excitation current.

The H-shaped elements 6 and the permanent magnets 8 are spaced apart at regular intervals on the rotor 5. The number of magnets 8 and the number of H-shaped elements 6 both correspond to the number of pairs of poles in the rotary machine, that is to say one half the number of stator slots 3. More precisely, the magnets 8 and the H-shaped elements 6 are distributed in such a way that, when an outer slot 6a is in line with a first slot 3 of the stator, the magnets 8 on either side of this H-shaped element are in line with those stator slots 3 which are on either side of this first slot 3.

The north/south orientation of the permanent magnets 8 is such that in the absence of any current in the rotor windings 9, they set up an essentially circumferential magnetic flux on the rotor 5 in the direction of the arrows indicated in FIG. 1. Thus, in the absence of any excitation current, there will be no field flowing through the stator 1 (or at most a negligible part). This will be so regardless of the angular position of the rotor 5, and no current (or at most a negligible current) will therefore be produced in the armature winding 4. The excitation of the machine is therefore zero.

If now a unidirectional current is caused to flow in the excitation winding 9 in such a way as to produce a magnetic flux in the opposite direction from that created by the magnets 8, this opposition forces the flux from the magnets 5 and the excitation winding 9 to cross the air gap and to extend into the stator 1 where the excitation current is sufficiently large.

As a result, an electromotive force will be produced in the armature. It will be understood that the value of this electromotive force depends on the amplitude of the magnetic field created by the excitation winding 9, so as to vary between a substantially zero value and a maximum value.

The magnets 8 and the excitation winding 9 are so dimensioned that the fluxes from the excitation winding are of the same order of magnitude as those from the magnets, for reasonable intensities of the excitation current. Thus, by regulating the variations of current in the winding 9, not only the flux of the excitation winding 9 is regulated, but so also is the flux of the magnets 8 in the stator. As a consequence, with the structure which has just been described, the operation of the electrical machine is regulated using a simple unidirectional current. This regulation may for example be obtained by means of a single transistor controlled by a regulating microprocessor.

With reference now to FIG. 2, one example of a polyphase machine in accordance with the present invention will now be described. In FIG. 2, those elements of the rotary machine of FIG. 1 which are repeated in FIG. 2 are given the same reference numerals with 100 added.

The machine represented in FIG. 2 is a three-phase machine and comprises a rotor 105 which is identical to that in FIG. 1, and which includes a plurality of H-shaped elements 106 disposed alternately with permanent magnets 108, the openings defined by the H-shaped elements receiving the turns of an excitation winding 109. The permanents magnets 108 are received in seatings 107, the depth of which is slightly smaller than the radial thickness of the rotor 105.

The stator 121 is continuous, i.e. endless, in the circumferential sense and is of conventional form comprising a stack of laminations. The stator 121 has six stator slots 103 per pair of rotor poles, these various slots 103 being defined by inner teeth 122 spaced apart angularly in a substantially regular manner. The slots 103 receive the distributed turns of the various phase windings 104a, 104b and 104c. Three successive slots 103 at the periphery of the stator contain respective turns of the three-phase windings.

The machine represented in FIG. 2 works on the same principle as that in FIG. 1. In particular, when no excitation is applied to the excitation winding 109, the permanent magnets 108 cooperate so as to produce a magnetic flux which flows almost entirely within the rotor, and the phase windings of the stator therefore deliver a substantially zero current.

By contrast, when an excitation is set up in the inverse sense of the field created by the permanent magnets, this gives rise to phenomena of looping of the fields around the various turns of the phase windings 104a, 104b and 104c, in such a way that, during rotation of the rotor at a given speed, the machine sets up a three-phase electromotive force which varies substantially between zero and a maximum value when the excitation current is varied between zero and a maximum excitation value.

In the examples shown in FIGS. 1 and 2, the rotors 5 and 105 are fitted on shafts not shown, which are of non-magnetic materials, or which are insulated by non-magnetic materials from the assemblies consisting of the permanent magnets, the H-shaped elements and the excitation windings.

However, other forms of construction are also possible. In particular, as shown in FIGS. 3 and 4 to which reference is now made, it is possible to have the rotor mounted between an outer stator and an inner stator.

Figure 4:
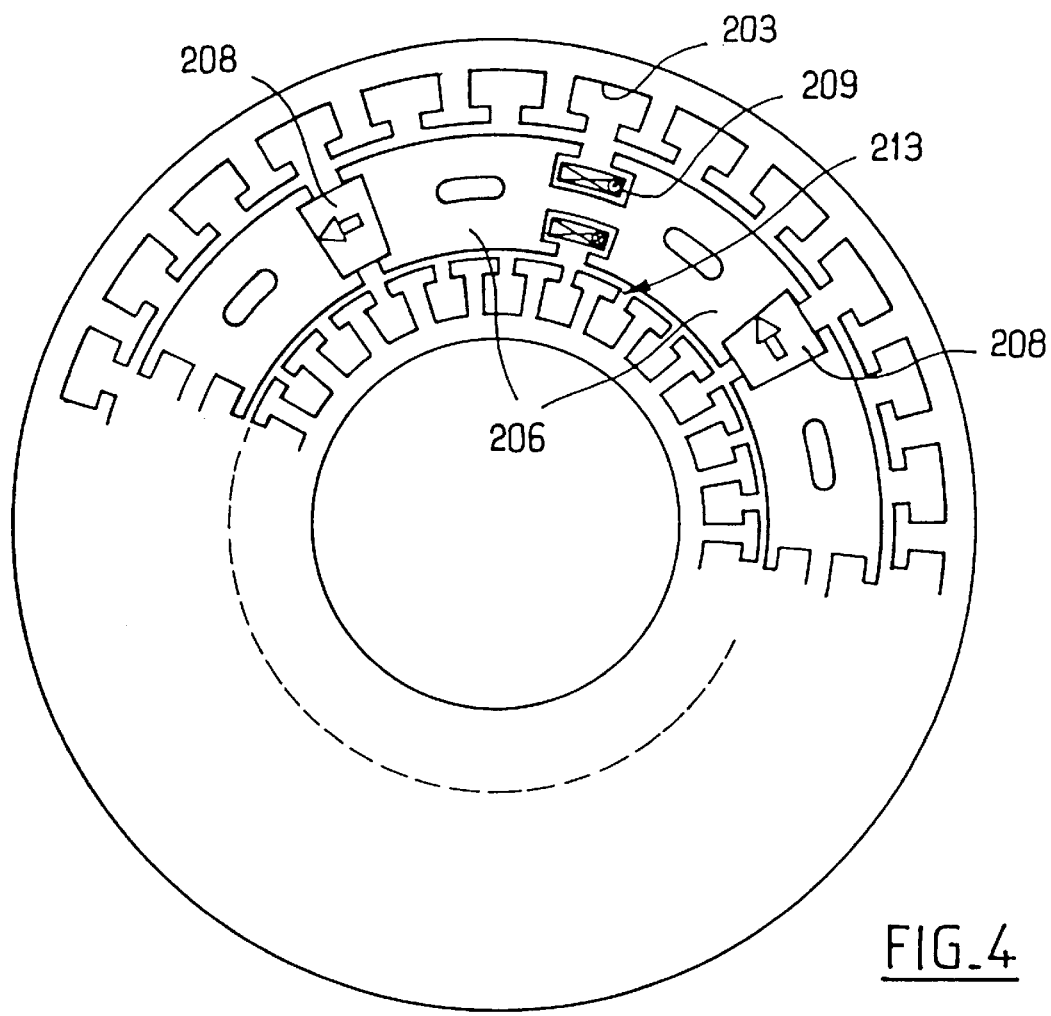
FIG. 4 is a view in transverse cross section of part of a rotor and stator assembly of a machine in accordance with yet another embodiment of the invention.

In FIGS. 3 and 4, those elements of the version shown in FIG. 1 that are repeated in FIGS. 3 and 4 are given the same reference numerals with 200 added. Thus in FIGS. 3 and 4 the machine comprises an outer stator 201 and a rotor 205, which are identical to the stator 1 and rotor 5, respectively, of FIG. 1.

In particular, the rotor 205 consists of a succession of H-shaped members 206 arranged alternately with permanent magnets 208, with the slots defined by the H-shaped members containing the turns of an excitation winding 209. As to the outer stator 201, this consists of a stack of laminations and it has at its inner periphery a succession of slots 203 receiving an armature winding 204.

The rotor 205 rotates between the outer stator 201 and an inner stator 211. The inner stator 211 again consists of a stack of laminations, and has along its inner periphery a succession of slots 213 which again receive an armature winding, 214. The number of slots 213 is identical to the number of the slots 203, with the slots 213 and 203 being aligned with each other as can be seen in FIGS. 3 and 4.

The machine with the structure shown in FIGS. 3 and 4 operates in a similar way to those shown in FIGS. 1 and 2. In the absence of any excitation current, the magnetic field from the permanent magnets 208 rotates in the rotor 205. No current is generated in the armature windings 204 and 214 during rotation of the rotor 205.

By contrast, when an excitation current is generated, the magnetic flux of the magnets 208 is forced to extend through the two air gaps into the inner and outer stators 201 and 211, and an electromotive force is generated in the armature windings 204 and 214.

It will be noted that the armature windings of the two stators 201 and 211 are independent, so that this structure has the advantage that it lends itself well to the construction of a dual voltage three-phase machine, in which the first stator can work at 14 volts and the second at 24 volts or 48 or 96 volts, according to the requirements of the circuitry of the vehicle.

Various structures of the same type as those which have been described above may of course be connected in parallel or in series with each other. In addition, it will be observed that the machines in FIGS. 1 to 4 can if necessary be subjected to an initial magnetization or to re-magnetization. More precisely, if the magnets are mounted in the stator without having first been magnetized, it is sufficient to energise the excitation windings with a current which is inverse to the normal excitation current. A circumferential magnetic field is set up in the rotor in the same direction as that which is produced by the permanent magnets, and this field is capable of magnetizing or re-magnetizing the magnets. This establishment of an inverse magnetizing or re-magnetizing field can for example be carried out using semiconductor switching means which a person familiar with this technical field will be able to achieve without any difficulty.

This operation may be carried out either on board the vehicle with the electrical energy supplied by the battery of the vehicle, or in the garage during servicing of the vehicle.

In addition, it will be noted that the fitting of the windings on the H-shaped elements or members is facilitated by the form of these structures and can be carried out separately from the fitting of the permanent magnets in place. In addition, when the magnets are magnetized, the assembly of the rotor on the stator or stators is made even easier due to the fact that the flux of the permanent magnets is closed in the rotor. There is thus no risk that the structure of the rotor will stick on the ferromagnetic components of, in particular, the inner and outer stators.

The novel structures provided by the invention give an increase of 10 to 20% in output as compared with those in the prior art.

The present invention is of course not limited to the embodiments described above and shown in the drawings. In particular, machines can be made in accordance with the features described above which work as generators, as well as motors, and also machines having any number of phases whatever. In addition, the construction of the excitation winding around the H-shaped elements (i.e. in the form of a toroidal winding) naturally improves resistance to centrifugal force, by contrast with the winding in machines with projecting poles.

It is known that the main disadvantage of permanent magnet alternators used in the automotive field arises from the permanent presence of a useful flux generated by the magnets, from which there arises a risk of loss of regulation. This can give rise to excessive voltages, leading to total or partial destruction of the components of the electrical network of the vehicle. The proposed structure eliminates this problem because, in the absence of any excitation, the flux of the magnets is neutralized because it cannot become closed through the stator.

What is claimed is:

1. An electrical machine comprising:
   at least one stator defining at least one pair of stator slots;
   at least one armature winding lodged in said stator slots; and
   a rotor rotatable with respect to the stator, the rotor including means for selectively establishing closed magnetic circuits passing around turns of the at least one armature winding,
   wherein the rotor defines a first circumferential direction and a second circumferential direction opposed to said first direction, said means for selectively establishing closed magnetic circuits comprising at least one permanent magnet adapted to establish a magnetic flux looped on itself in said first circumferential direction, and at least one excitation winding for establishing an adjustable local magnetic flux in said second circumferential direction, the magnets and excitation windings being arranged alternately along the periphery of the rotor.

2. The machine according to claim 1, wherein the rotor further includes a plurality of H-shaped elements defining rotor slots, the excitation windings being received in said rotor slots and the H-shaped elements being disposed alternately with the magnets.

3. A motor vehicle alternator comprising the machine according to claim 1.

4. An electrical machine comprising:
   at least one stator defining at least one pair of stator slots, the stator having an outer stator and an inner stator which are coaxial with each other;
   at least one armature winding lodged in said stator slots; and
   a rotor rotatable with respect to the stator, the rotor including means for selectively establishing closed magnetic circuits passing around turns of the at least one armature winding,
   wherein the rotor defines a first circumferential direction and a second circumferential direction opposed to said first direction, said means for selectively establishing closed magnetic circuits comprising at least one permanent magnet adapted to establish a magnetic flux looped on itself in said first circumferential direction, and at least one excitation winding for establishing an adjustable local magnetic flux in said second circumferential direction.

5. The machine according to claim 4, wherein the two stators have the same number of said stator slots, said stator slots of the outer stator being in line with the corresponding stator slots of the inner stator.

6. The machine according to claim 5, being a dual voltage rotary machine.

7. The machine according to claim 6 being a combined starter motor and alternator for a motor vehicle.

8. An electrical machine comprising:
   at least one stator defining at least one pair of stator slots;
   at least one armature winding lodged in said stator slots;
   a rotor rotatable with respect to the stator the rotor including means for selectively establishing closed magnetic circuits passing around turns of the at least one armature winding; and
   means for establishing with the aid of the at least one excitation winding an inverse magnetic field for magnetizing an unmagnetized magnet to provide the at least one permanent magnet,
   wherein the rotor defines a first circumferential direction and a second circumferential direction opposed to said first direction, said means for selectively establishing closed magnetic circuits comprising at least one permanent magnet adapted to establish a magnetic flux looped on itself in said first circumferential direction, and at least one excitation winding for establishing an adjustable local magnetic flux in said second circumferential direction.

9. A rotor for a hybrid electrical machine with dual excitation, having at least one armature winding defining turns of the at least one armature winding, the rotor comprising:
   means for selectively establishing closed magnetic circuits passing around the armature winding turns, said means for selectively establishing including at least one permanent magnet for establishing a magnetic flux looped on itself in a first circumferential direction of the rotor; and at least one excitation winding for establishing an adjustable local magnetic flux in a second circumferential direction inverse to the first circumferential direction, wherein the magnets and excitation windings are arranged alternately along the periphery of the rotor.

10. An apparatus comprising:

at least one stator;

at least one armature winding arranged on the stator;

a rotor rotatable with respect to the stator;

at least one permanent magnet, arranged on the rotor, to establish a magnetic flux looped on itself in a first circumferential direction defined by the rotor; and and at least one excitation winding, arranged on the rotor, to establish a local magnetic flux in a second circumferential direction opposite the first direction, the magnets and excitation windings being arranged alternately along the periphery of the rotor.

11. The apparatus according to claim 10, wherein the stator includes at least one pair of stator slots for holding the armature winding.

12. The apparatus according to claim 10, wherein the magnetic flux established by the excitation winding is adjustable.

13. The apparatus according to claim 10, wherein the rotor further includes a plurality of H-shaped elements defining rotor slots, the excitation windings being received in said rotor slots and the H-shaped elements being disposed alternately with the magnets.

14. An apparatus comprising;

at least one stator having an outer stator and an inner stator which are coaxial with each other;

at least one armature winding arranged on the stator;

a rotor rotatable with respect to the stator;

at least one permanent magnet, arranged on the rotor, to establish a magnetic flux looped on itself in a first circumferential direction defined by the rotor; and and at least one excitation winding, arranged on the rotor, to establish a local magnetic flux in a second circumferential direction opposite the first direction.

15. The apparatus according to claim 14, wherein the two stators have the same number of said stator slots, said stator slots of the outer stator being in line with the corresponding stator slots of the inner stator.

16. An apparatus comprising:

at least one stator;

at least one armature winding arranged on the stator;

a rotor rotatable with respect to the stator;

at least one permanent magnet, arranged on the rotor, to establish a magnetic flux looped on itself in a first circumferential direction defined by the rotor;

and at least one excitation winding, arranged on the rotor, to establish a local magnetic flux in a second circumferential direction opposite the first direction; and means for establishing with the aid of the at least one excitation winding an inverse magnetic field for magnetizing an unmagnetized magnet to provide the at least one permanent magnet.

17. A rotor for a hybrid electrical machine with dual excitation having at least one armature winding defining turns of the at least one armature winding, the rotor comprising:

at least one permanent magnet to establish a local magnetic flux in a first circumferential direction of the rotor; and at least one excitation winding to establish an adjustable local magnetic flux in a second circumferential direction opposite to the first circumferential direction, the excitation windings and magnets being arranged alternately along the periphery of the rotor.

* * * * *